Figure 1:
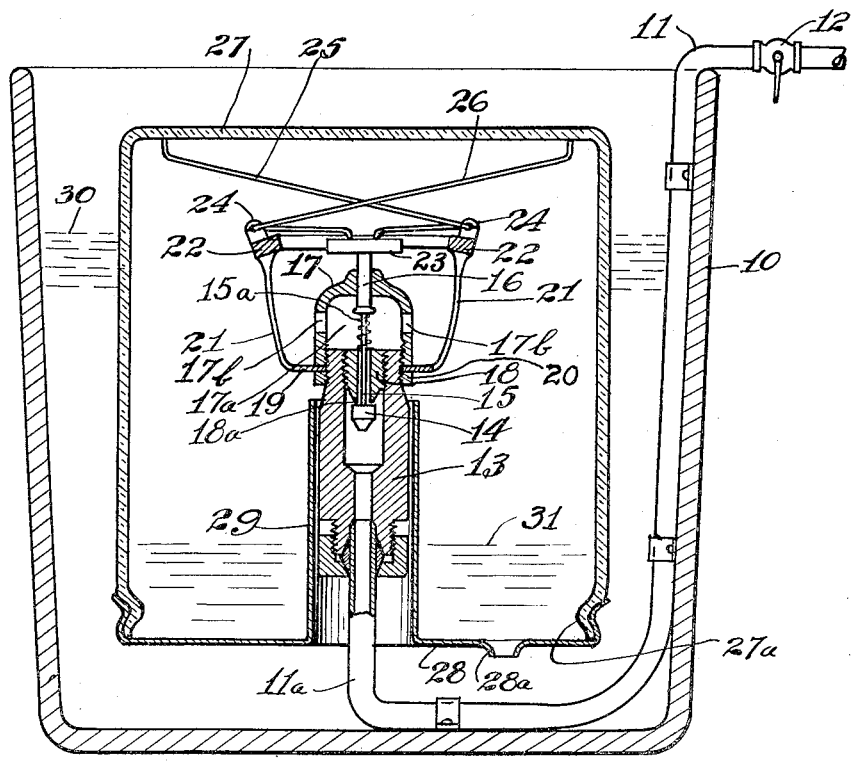

Sept. 12, 1933.  C. L. ARMSTRONG  1,926,018

FLOAT VALVE CONSTRUCTION

Filed May 2, 1930

INVENTOR
CLOYD L. ARMSTRONG.

By Albert C. Bell
ATTORNEY.

Patented Sept. 12, 1933

1,926,018

UNITED STATES PATENT OFFICE 1,926,018

FLOAT VALVE CONSTRUCTION

Cloyd L. Armstrong, Lima, Ohio

Application May 2, 1930. Serial No. 449,160

17 Claims. (Cl. 137—104)

My invention relates to an improved float valve construction which, while it may be used for various purposes, is particularly adapted for use in maintaining a desired water level in water pans used with furnaces for heating purposes. In connection with such furnaces, particularly hot air furnaces, it is well known that the heated air delivered by the furnace is usually much drier than is desirable from the standpoint of health and from the standpoint of wood work with which the heated air comes in contact. To lessen this difficulty, it is usual to provide such furnaces with tanks of various kinds and sizes, to contain water in contact with the air that is to be heated or with the air that has been heated, to the end that the air delivered by the furnace may be more moist than if the tank and water were not employed. While humidifying tanks of the kind referred to, deliver the heated air from the furnace in a condition of desired humidity, they are still open to the objection that they must receive frequent attention, in order that the water level in the tanks may be maintained at the necessary point to make the tanks effective. Where it is attempted to employ automatic valve mechanism to maintain the water level at the desired point in such tanks, the operation has not, as far as I am aware, heretofore been satisfactory, because of the water tanks being closely associated with highly heated parts of the furnace, as a result of which the valve mechanism becomes highly heated and soon is damaged sufficiently by the heat so that it will no longer perform its intended function. Furthermore, automatic valve mechanisms having float control have heretofore effected the opening and closing of the valve, gradually, that is to say, when the water level drops slightly below its normal position, the valve is opened slightly by downward movement of the float, and the water flowing through the valve, is necessarily restricted to a small stream of considerable velocity of flow, which produces considerable noise, particularly where the valve mechanism permits vibration of the valve parts.

By my improved construction I avoid the difficulties pointed out, by so constructing my float that all of the valve mechanism is contained within it and thus protected from the highly heated portions of the furnace. Furthermore, I preferably construct my float of material which is a poor conductor of heat, for example glass, and since the water supplied to the tank is introduced into the float and around the valve mechanism, and the heat of the highly heated parts of the furnace is kept outside of the float, the valve mechanism is kept at all times in relatively cool condition, and there is no deterioration of my valve mechanism even with long use. By my invention, I provide a further improvement which consists of providing operating devices which, when they move the valve member from its seat, move it at once to its fully opened position, and which, when the water level in the tank is again brought to the desired point, permit the valve to move from its fully opened position to its fully closed position, thus avoiding all undesirable effects resulting from having the valve in a slightly opened condition.

Figure 2:
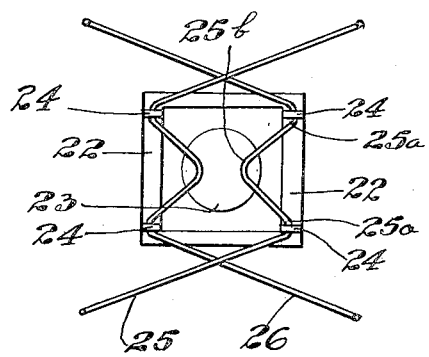

My invention will best be understood by reference to the accompanying drawing showing a preferred embodiment thereof, in which Fig. 1 illustrates my float valve construction in vertical sectional view in a water tank, the water level of which it is to control, and Fig. 2 shows in top view, to a reduced scale, the operating arms of the valve operating mechanism, with the float removed.

Similar numerals refer to similar parts throughout the several views.

In Fig. 1 I illustrate a water tank at 10, which may be used for any desired purpose and particularly as a humidifying tank in a furnace used for heating purposes. A water supply pipe 11 extends into the tank 10 along one of its side walls and across its bottom wall, to which it may be secured in any convenient manner, said pipe being preferably provided with a shut-off valve 12 as indicated, and extending from said valve to any source of water under pressure, for example, the water supply system of the locality where the tank is used, or to a water supply tank. From the bottom of the tank 10, the pipe 11 extends upwardly as illustrated at 11a, centrally of the tank, and at its upper end has secured thereto a valve casing 13 containing a valve member 14 from which a valve stem 15 extends upwardly through the valve casing to its exterior, to be engaged at its upper end by a plunger 16 extending vertically through a guide 17 carried by the upper end of the valve casing 13. The upper end of the bore of the valve casing 13 is threaded, to receive a correspondingly threaded sleeve 18 formed at its lower end as indicated at 18a, to constitute a valve seat for the valve member 14, so that the valve member 14 and valve stem 15 may be conveniently assembled in the valve casing 13 and removed therefrom when necessary, for repair and replacement. The upper end of the valve casing 13 is externally threaded to engage corresponding internal threads in the lower end of the guide member 17, and between its upper and lower ends, the guide member 17 is provided with a compartment 17a to receive water that may be delivered to the device through the valve casing 13, there being discharge apertures 17b through the side wall of the compartment 17a to permit water delivered to the compartment to flow freely therefrom. Below the guide member 17, the casing 13 carries a supporting member 19 which is tightly clamped against the guide member 17, by a nut 20 engaging the external threads on the upper end of the casing 13. From the supporting member 19, a plurality of arms 21 extend upwardly to support a frame 22, 22, carrying upwardly extending lugs 24, 24, which, as more clearly shown in Fig. 2, form bearing supports for operating arms 25 and 26. The operating arms 25 and 26 extend at their upper ends so that they are in engagement with or adjacent to the inner upper surface of the float 27 of the mechanism. Each of the arms 25 and 26, is made of spring metal, for example spring wire, and bent as shown at 25a to extend laterally of the end portions of the arm through two of the lugs 24, between which, the mid-portion of the arm is bent towards its end portions and downwardly as shown at 25b to rest against the mid-portion of a disk 23 carried by the upper end of the plunger 16. The valve stem 15 is provided with a light spring 15a tending to move the valve member 14 towards the valve seat 18a when the pressure on the plunger 16 permits such action.

The float 27 has closed top and side walls, being preferably an open mouth vessel or jar placed in inverted position over the arms 25 and 26 and over the valve mechanism described. The float is preferably of material having low heat conductivity, for example glass, and preferably is provided at its lower end with screw threads 27a for engaging corresponding threads on a cap 28 which may be of any desired material for example sheet metal. The cap 28 has extending upwardly from it, a tubular portion 29, concentric with the valve casing 13, and of an internal diameter to loosely fit the exterior of the valve casing. The length of the tubular portion 29 is such that when the float member is in its uppermost position, the upper end of the tubular extension will be slightly below the nut 20. The cap 28 is provided with a vent opening 28a to permit the flow of water from the float into the tank 10.

The valve mechanism described, is such that water entering the casing 13 under pressure from the pipe 11, tends to move the valve member 14 to its closed position against its seat 18a, there being sufficient clearance in the casing 13 around the valve member 14, and in the sleeve 18 around the valve stem 15, to permit free flow of water through the valve, when the valve member 14 is moved downwardly away from its seat.

The operation of the construction described is as follows: when the water level in the tank 10 is at its desired position, for example as indicated at 30, the float 27 is in its uppermost position, and the valve member 14 is in its closed position. When the water level in the tank 10 is lowered, the position of the float 27 is lower than that indicated, which springs the arms 25 and 26 downwardly, due to the weight of the float 27. This in turn produces a pressure on the disk 23, which, however, for initial movement of the float 27 downwardly, the water pressure on the valve member 14, is sufficient to withstand, so that the plunger 16 is not moved materially from the position indicated in Fig. 1 of the drawing. As the water level in the tank 10 continues to lower, the float 27 continues to move downwardly and exerts increasing force upon the mid-portions of the arms 25 and 26, until the pressures thus exerted upon the disk 23, overcome the water pressure on the valve member 14, and said valve member is moved quickly to its fully opened position, which movement is followed up by the mid-portions of the arms 25 and 26, due to their flexed condition under the weight of the float 27, the upward reaction of the arms on the float 27 is decreased, and the float assumes a lower position, and as a result of the follow up movement of the mid-portions of the arms 25 and 26, the valve member 14 is held in its fully opened position. This condition of the parts is maintained until the level of the water in the tank 10 again reaches the position indicated at 30. During the upward movement of the float 27, the flow of water through the valve casing 13 constantly tends to move the valve member 14 to its closed position, which movement however, is prevented by the pressure exerted downwardly on the plunger 16 by the mid-portions of the arms 25 and 26. It will further be observed that the tendency of the valve member 14 to move to its seat, is much less for its fully opened position, than it is for its nearly closed position, also that with the valve member 14 on its seat, a much greater pressure is required on the plunger 16 to start it from its seat, than is required subsequently to hold it in its fully opened position. As the float 27 rises with a rise in water level in the tank 10, the downward pressure on the mid-portion of the arms 25 and 26 is reduced until the pressure on the valve member 14 by the water flowing through the valve casing is sufficient to overcome the downward pressure on the plunger 16, and the valve member 14 at once moves to its closed position, which movement is permitted by the flexing of the arms 25 and 26.

The water level 31 in the float 27 is at all times lower than the water level in the tank 10, and when water is admitted into the float through the openings 17b by the opening of the valve member 14, the air pressure in the float above the water level 31 is increased, which forces the water in the float outwardly through the vent 28a.

I find that the construction described will operate effectively as described, for a wide range of water pressures in the pipe 10, for example from one pound per square inch to one hundred and twenty pounds per square inch, with the same construction and adjustment of the parts, thus making the automatic controlling mechanism of the valve, practically independent of the water pressure employed in the pipe 10.

From the above it will be observed that by my construction I provide an improved float valve mechanism by which the valve mechanism is entirely contained in the float, the valve is positively and quickly moved from its closed position to its fully opened position and is quickly and positively moved from its open position to its closed position when the float is in its lower and upper positions respectively, avoiding the possibility of a trickling high velocity flow which would be noisy and unduly wear the valve member 14 and its seat 18a, also that the valve mechanism is of simple construction and may readily be replaced, and that the entire mechanism is of simple construction and effective in operation.

While I have shown my invention in the particular embodiment above described, it will be understood that I do not limit myself to this exact construction as I may employ equivalents known to the art at the time of the filing of this application without departing from the scope of the appended claims.

What I claim is:

1. In a float valve construction, the combination of a tank, a water supply pipe extending upwardly from the lower portion of said tank, a valve casing carried by the upper end of said pipe, a valve member in said casing held upon its seat by water pressure in said pipe for the closed position of said member, a valve stem extending upwardly from said member through said casing, a guide member carried by the upper end of said casing, a vertical plunger in said guide member and engaging said stem, a disk carried by the upper end of said plunger above said guide member, arms of spring metal pivotally supported to rest at their lower ends upon said disk, a glass jar float surrounding said casing, said disk and said arms, said arms extending at their upper ends to engage the inner surface of the top wall of said float and support a part of its weight at all times, and a cap closing the lower end of said float and having a central tubular portion extending upwardly around and adjacent said valve casing and constituting a guide for said float, said cap having an outlet opening for draining water in said float into said tank, whereby when the water level in said tank is lowered said float rests upon said arms flexing them and the spring action of said arms imparts movement to said plunger, said valve stem and said valve member completely opening the latter.

2. In a float valve construction, the combination of a tank, a water supply pipe extending upwardly from the lower portion of said tank, a valve casing carried by the upper end of said pipe, a valve member in said casing held upon its seat by water pressure in said pipe for the closed position of said member, a valve stem extending upwardly from said member through said casing, a guide member carried by the upper end of said casing, a vertical plunger in said guide member and engaging said stem, a disk carried by the upper end of said plunger above said guide member, spring arms extending upwardly from said disk, and a float surrounding said valve mechanism, said disk and said arms and engaging the upper ends of said arms and partly supported at all times by said arms, said float having a guide adjacent said valve casing.

3. In a float valve construction, the combination of a valve casing, a valve member movable in said casing to its closed position in the direction of liquid flow through said casing, whereby pressure of liquid in communication with said valve member tends to hold the latter in its closed position, a stem extending from said valve member, a float separated from and out of engagement with said stem, and a spring engaging said stem and said float and at all times supporting a part of the weight of said float.

4. In a float valve construction, the combination of a valve casing, a valve member movable in said casing to its closed position in the direction of liquid flow through said casing, whereby pressure of liquid in communication with said valve member tends to hold the latter in its closed position, a stem extending from said valve member, a float separated from and out of engagement with said stem, and a spring engaging said stem and said float and at all times supporting a part of the weight of said float, said float surrounding said valve and said spring.

5. In a float valve construction, the combination of a valve casing, a valve member movable in said casing to its closed position in the direction of liquid flow through said casing, whereby pressure of liquid in communication with said valve member tends to hold the latter in its closed position, a stem extending from said valve member, a float separated from and out of engagement with said stem, and a spring resting on said stem, said float resting loosely on said spring and supported in part thereby.

6. In a float valve construction, the combination of a valve casing, a valve member movable in said casing to its closed position in the direction of liquid flow through said casing, whereby pressure of liquid in communication with said valve member tends to hold the latter in its closed position, a stem extending from said valve member, a float separated from and out of engagement with said stem, and a spring resting on said stem, said float resting loosely on said spring and supported in part thereby, said float surrounding said valve and said spring.

7. In a float valve construction, the combination of a valve casing, a valve member movable in said casing to its closed position in the direction of liquid flow through said casing, whereby pressure of liquid in communication with said valve member tends to hold the latter in its closed position, a stem extending from said valve member, a float, a spring wire bent to form a pivot portion and having two portions extending from said pivot portion, and a support for said pivot portion carried by said casing, a first one of said extending portions engaging said stem, and the second of said extending portions engaging said float to at all times exert a pressure on said valve member tending to move it in a direction to open it.

8. In a float valve construction, the combination of a valve casing, a valve member movable in said casing to its closed position in the direction of liquid flow through said casing, whereby pressure of liquid in communication with said valve member tends to hold the latter in its closed position, a stem extending from said valve member, a float, a spring wire bent to form a pivot portion and having two portions extending from said pivot portion, and a support for said pivot portion carried by said casing, a first one of said extending portions resting loosely on said stem, and said float resting loosely on the second of said extending portions.

9. In a float valve construction, the combination of a valve casing, a valve member movable in said casing to its closed position in the direction of liquid flow through said casing, whereby pressure of liquid in communication with said valve member tends to hold the latter in its closed position, a stem extending from said valve member, a float, a spring wire bent to form a pivot portion and having two portions extending from said pivot portion, and a support for said pivot portion carried by said casing, a first one of said extending portions engaging said stem, and the other of said extending portions engaging said float to at all times exert a pressure on said valve member tending to move it in a direction to open it, the extending portions of said spring constituting lever arms of unequal length, said first extending portion being shorter than said second extending portion.

10. In a float valve construction, the combination of a valve casing, a valve member movable in said casing to its closed position in the direction of liquid flow through said casing, whereby pressure of liquid in communication with said valve member tends to hold the latter in its closed position, a stem extending from said valve member, a float, a spring wire bent to constitute a first lever arm at its mid portion, adjacent bearing portions, and a pair of second lever arms, and supports for said bearing portions carried by said casing, said first lever arm engaging said stem, and said second lever arms engaging said float and tending to support the latter.

11. In a float valve construction, the combination of a valve casing, a valve member movable in said casing to its closed position in the direction of liquid flow through said casing, whereby pressure of liquid in communication with said valve member tends to hold the latter in its closed position, a stem extending from said valve member, a float, a spring wire bent to constitute a first lever arm at its mid portion, adjacent bearing portions, and a pair of second lever arms, and supports for said bearing portions carried by said casing, said first lever arm engaging said stem, and said second lever arms engaging said float and tending to support the latter, said first lever arm being shorter than said second lever arms.

12. In a float valve construction, the combination of a valve casing, a valve member movable in said casing to its closed position in the direction of liquid flow through said casing, whereby pressure of liquid in communication with said valve member tends to hold the latter in its closed position, a stem extending from said valve member, a float, a spring wire bent to constitute a first lever arm at its mid portion, adjacent bearing portions, and a pair of second lever arms, and supports for said bearing portions carried by said casing, said first lever arm resting loosely on said stem, and said float resting loosely on said second lever arms.

13. In a float valve construction, the combination of a valve casing, a valve member movable in said casing to its closed position in the direction of liquid flow through said casing, whereby pressure of liquid in communication with said valve member tends to hold the latter in its closed position, a stem extending from said valve member, a float, a spring wire bent to constitute a first lever arm at its mid portion, adjacent bearing portions, and a pair of second lever arms, and supports for said bearing portions carried by said casing, said first lever arm engaging said stem, and said second lever arms engaging said float and tending to support the latter, said bearing portions and supports being separated axially, and said second lever arms diverging from said bearing portions.

14. In a float valve construction, the combination of a valve casing, a valve member movable in said casing to its closed position in the direction of liquid flow through said casing, whereby pressure of liquid in communication with said valve member tends to hold the latter in its closed position, a stem extending from said valve member, a float, two springs each comprising a spring wire bent to constitute a first lever arm at its mid portion, adjacent bearing portions, and a pair of second lever arms, and supports for said bearing portions carried by said casing, the bearing portions and supports for said springs being on opposite sides of said stem, said first lever arms engaging said stem, and said two pairs of second lever arms engaging said float and tending to afford stable support therefor.

15. In a float valve construction, the combination of a valve casing, a valve member movable in said casing to its closed position in the direction of liquid flow through said casing, whereby pressure of liquid in communication with said valve member tends to hold the latter in its closed position, a stem extending from said valve member, a float, two springs each comprising a spring wire bent to constitute a first lever arm at its mid portion, adjacent bearing portions, and a pair of second lever arms, and supports for said bearing portions carried by said casing, the bearing portions and supports for said springs being on opposite sides of said stem, said first lever arms engaging said stem, and said two pairs of second lever arms engaging said float and tending to afford stable support therefor, said first lever arms being of substantially the same length, and said second lever arms being of substantially the same length and longer than said first lever arms.

16. In a float valve construction, the combination of a valve casing, a valve member movable in said casing to its closed position in the direction of liquid flow through said casing, whereby pressure of liquid in communication with said valve member tends to hold the latter in its closed position, a stem extending from said valve member, a float, two springs each comprising a spring wire bent to constitute a first lever arm at its mid portion, adjacent bearing portions, and a pair of second lever arms, and supports for said bearing portions carried by said casing, the bearing portions and supports for said springs being on opposite sides of said stem, said first lever arms resting loosely on said stem, and said float resting loosely on all of said second lever arms.

17. In a float valve construction, the combination of a valve casing, a valve member movable in said casing to its closed position in the direction of liquid flow through said casing, whereby pressure of liquid in communication with said valve member tends to hold the latter in its closed position, a stem extending from said valve member, a float, two springs each comprising a spring wire bent to constitute a first lever arm at its mid portion, adjacent bearing portions, and a pair of second lever arms, and supports for said bearing portions carried by said casing, the bearing portions and supports for said springs being on opposite sides of said stem, said first lever arms engaging said stem, and said two pairs of second lever arms engaging said float and tending to afford stable support therefor, the bearing portions of and supports for each of said springs being separated axially, and the second lever arms of each of said springs diverging from the corresponding bearing portions.

CLOYD L. ARMSTRONG.